Jan. 15, 1929.  1,698,837

E. BELLINI

BALANCING RADIOGONIOMETER

Filed March 19, 1926

INVENTOR
ETTORE BELLINI
BY Ira J. Adams
ATTORNEY

Patented Jan. 15, 1929.

1,698,837

UNITED STATES PATENT OFFICE.

ETTORE BELLINI, OF PARIS, FRANCE.

BALANCING RADIOGONIOMETER.

Application filed March 19, 1926, Serial No. 95,824, and in France May 8, 1925.

It is well known that symmetry in coils or loops used in connection with radiogoniometry work is of great importance. The slightest deficiency in symmetry produces wrong minimum signal strengths in reception, and this leads to more or less great errors in the taking of bearings.

French Patent No. 567,587 discloses means adapted to insure almost exact symmetry, the scheme in question being here produced in Fig. 1. To be true, symmetry is not absolutely exact, since one of the coats of the variable condenser is connected with the grid of the first thermionic tube. Since the heating battery is grounded and also the middle point of the coil, it follows that the resistances and the capacitance between grid and filament are governed by the middle point of the coil and one armature of the condenser, and this, as will be understood, makes the coil or loop dissymmetric, strictly speaking. In Fig. 1 the said capacity and resistance are indicated by dotted lines. Now, the capacitance is usually of an order of several centimeters, while the resistance is very high. In most cases, the symmetry of the loop will be practically perfect. But conditions change, if very strong signals are received, or if the amplifier starts oscillating for some reason or another. Indeed, in all of such cases the filament-grid resistance becomes relatively low; and since the loop is then appreciably dissymmetrical, it follows that the minimum values of the incoming signal vanish, and this makes the taking of bearings difficult if not entirely impossible.

The present invention will be readily apparent when read in connection with the accompanying drawing in which.

Figure 1:
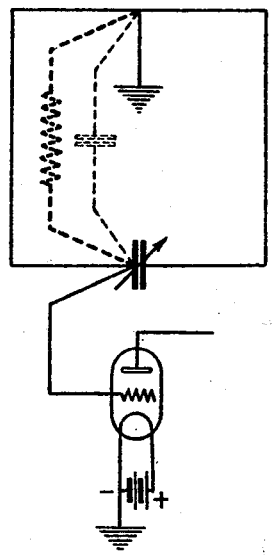
Fig. 1 is a diagrammatic view of a loop and its associated tube.
Figure 2:
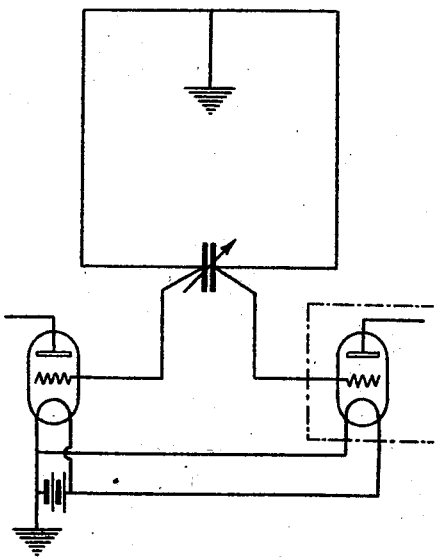
Figs. 2, 3 and 4 are modifications of the method of balancing the loop.

Now, according to the invention forming the object to this invention this inconvenience and defect is obviated by connecting the other coat of the variable condenser with a tube similar to the other, as shown in Fig. 2. This auxiliary tube, which serves solely for the purpose of restoring balanced conditions, can be called the balancing tube. The plate of the latter may be united with the positive pole of the plate battery either directly or else through the intermediary of a resistance, a self-inductance coil, or the primary of a radio-frequency transformer identical to those inserted in the plate circuit of the first amplifier tube. The secondary circuit of this transformer may be left open, or else may be connected in series or in parallel with the secondary of the rf. transformer of the first amplifier tube.

Figure 3:
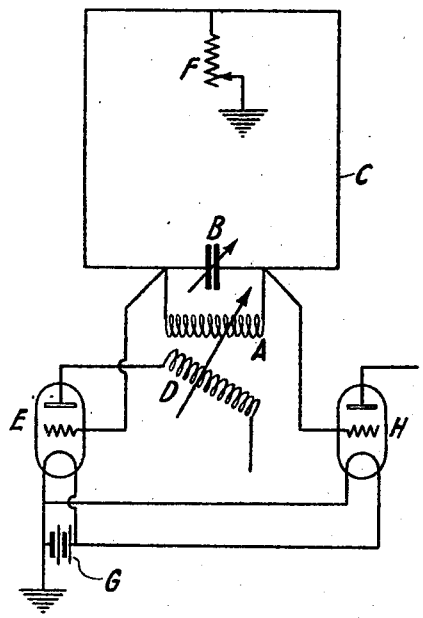
Figure 4:
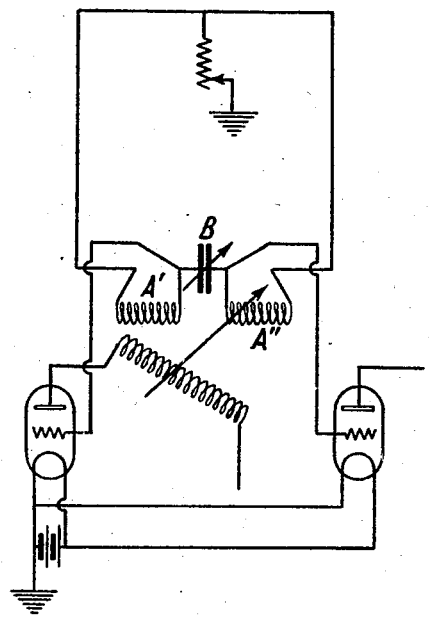

However, the said balancing tube could also be used for reaction purposes. Two embodiments of this idea selected from a great number of possible schemes are illustrated in Figs. 3 and 4. According to Fig. 3, a coil A is disposed across the terminals of condenser B pertaining to the loop C; a coil D arranged in series in the plate circuit of the compensating tube E may be coupled magnetically with the coil A thereby introducing reaction. The equipment further includes preferably a connection with ground through a variable resistance F of the middle point of coil C, and further a ground connection of the heating battery G jointly serving the tube E and the amplifier arrangement in which tube H constitutes the first element.

Fig. 4 represents an installation comprising the same arrangements, and which differs from the preceding scheme only by the division into two parts A' and A'' of coil A shown in Fig. 3, and the insertion of each of said parts in series in the loop upon either side of the condenser B.

This method to obtain reaction or to receive by the autodyne method offers great advantages especially in the case of work with short waves, where a lack of symmetry in the loop, even when of but small value, causes immediately a loss of the minimum signal point and thus prevents the production of an even approximate bearing.

The present method further is adapted to remove doubts in the application of the methods disclosed in the patent above referred to and in the additions Nos. 18,386 and 19,240 thereto.

I claim as my invention:

1. In directional aerial systems, a loop antenna having a tuning condenser connected therewith, a groud connection symmetrical with respect to said condenser having a resistance in series therewith, and electron discharge apparatus having two pairs of grid-cathode and anode-cathode circuits grounded at the cathode terminals, said grids being connected respectively to opposite plates of the condenser.

2. In directional aerial systems, a loop antenna having a tuning condenser connected therewith, a ground connection symmetrical with respect to said condenser having a resistance in series therewith, and electron discharge apparatus having two pairs of grid-cathode and anode-cathode circuits grounded at the cathode terminals, said grids being connected respectively to opposite plates of the condenser, an inductance symmetrically connected with said condenser, a second inductance in one of the anode-cathode circuits in inductive relation to the first inductance, the other of said anode cathode circuits being adapted to be associated with indicating apparatus.

3. In directional aerial systems, a loop antenna having a tuning condenser connected therewith, a ground connection symmetrical with respect to said condenser having a variable resistance in series therewith, and electron discharge apparatus having two pairs of grid-cathode and anode-cathode circuits grounded at the cathode terminals, said grids being connected respectively to opposite plates of the condenser, a pair of inductances symmetrically connected in series with said condenser, a third inductance in one of the anode-cathode circuits in inductive relation to said pair of inductances, the other of said anode cathode circuits adapted to be associated with indicating apparatus.

4. In the art of radio signalling, means for electrically balancing a radiogoniometer coil having a tuning condenser connected therewith, comprising an electron discharge tube connected with each of the opposite plates of said condenser, a tuning coil associated with said condenser, and a coupling coil in the plate circuit of one of said electron discharge tubes variably coupled to said last mentioned coil.

5. In the art of radio signalling, means for electrically balancing a radiogoniometer coil having a tuning condenser connected therewith, comprising an electron discharge tube connected with opposite plates of said condenser, a tuning coil associated with said condenser, and a coupling coil in the plate circuit of one of said electron discharge tubes variably coupled to said last mentioned coil, and a variable resistance connected between the mid-point of the radiogoniometer coil and the ground.

6. In a system of the class described, a radiogoniometer coil having a condenser therein, a plurality of vacuum tubes associated with opposite plates of said condenser, a plurality of inductances associated with said condenser, and means for variably coupling said inductances with the plate circuit of one of said vacuum tubes.

7. In a directional aerial system, a loop antenna, a variable condenser in series therewith, a connection between the electrical midpoint of said loop and ground, a resistance in said connection, a pair of thermionic tubes each having cathode anode and control electrodes, grounded heating means for said cathodes and a direct connection between each terminal of said variable condenser and the control electrode of one of said tubes.

8. In a directional aerial system, a loop antenna, a pair of inductances and a variable condenser in series with said loop, a connection between the electrical midpoint of said loop and ground, a resistance in said connection, a pair of thermionic tubes each having cathode, anode and control electrodes, grounded heating means for said cathodes, a direct connection between each terminal of said condenser and the control electrode of one of said tubes, and an inductance in the anode circuit of one of said tubes variably coupled to said first named inductances.

ETTORE BELLINI.